United States Patent Office 2,772,301
Patented Nov. 27, 1956

2,772,301

IMPROVING GEL STRENGTH OF VEGETABLE WAXES

Edward A. Wilder, Racine, Wis., assignor to S. C. Johnson & Son, Inc., Racine, Wis.

No Drawing. Application May 4, 1953, Serial No. 353,014

5 Claims. (Cl. 260—404.8)

This invention relates to a method of treating certain vegetable waxes and the product resulting therefrom. More particularly, the invention relates to a method of substantially increasing the gel-formation properties of ouricuri, caranda, sugar cane, deresinated candelilla and esparto grass waxes and the new improved waxes produced by such method.

The prior art in the formulation of paste wax polishes has well appreciated the physical capacity of carnauba wax to form gels when dissolved in a suitable solvent and cooled. This wax, in addition to its outstanding gel-formation properties, possesses the hardness, ability to give a high gloss and compatibility with other waxes in various formulations that are most desirable in wax coating products.

Because of its limited availability and relative high cost, other less expensive vegetable waxes have been sought which could be used as an operable equivalent of carnauba. Whereas these other waxes may possess the hardness, compatibility and gloss-producing capacity required, they have heretofore been most deficient in gel-formation properties.

I have found that certain vegetable waxes, if modified and processed in a specific manner, do possess gel-formation properties comparable to that of carnauba.

Now in accordance with my invention, I have discovered a method of improving the gel strength of ouricuri, caranda, sugar cane, deresinated candelilla and esparto grass waxes without adversely affecting the other desirable wax characteristics, which comprises esterifying 40 to 85% of the free hydroxyl groups of the wax. The only operable esterifying agents are materials selected from the group consisting of maleic, succinic and glutaric anhydrides.

I have also discovered, as a result of this process, a modified wax which is vegetable wax selected from the group consisting of ouricuri, caranda, sugar cane, deresinated candelilla and esparto grass waxes having from 40 to 85% of its free hydroxyl groups esterified with a material selected from the group consisting of maleic, succinic and glutaric anhydrides.

Now, having indicated in a general way the nature and purpose of this invention, the following examples will illustrate the invention. It is to be understood, however, that such examples are presented merely as illustrations of the invention and are not construed as limiting the same.

Example 1

Two pounds of ouricuri wax with the following characteristics was melted in a suitable reaction vessel.

1. Hydroxyl No. 50.2
2. Gel strength value 236

The molten wax was heated to 135° C. and .22 pound of succinic anhydride was added with constant agitation. The molten mixture was stirred and maintained at this temperature for approximately two hours, at which time the excess anhydride was removed by washing with water. The wax was recovered and had the following characteristics.

1. Hydroxyl No. 21.2
2. Gel strength value 168

Example 2

Two pounds of ouricuri wax was processed exactly as described in Example 1, except that maleic anhydride was substituted for succinic anhydride and the product had the following characteristics.

1. Hydroxyl No. 27.3
2. Gel strength value 169

Example 3

Two pounds of esparto wax was processed exactly as described in Example 1.

Properties of original wax:
 1. Hydroxyl No. 26
 2. Gel strength value 244
Properties of modified wax:
 1. Hydroxyl No. 12
 2. Gel strength value 184

The gel strength value as shown in the examples is the cone penetrometer reading of an 18% gel. These determinations were conducted by melting at 100° C., 18 grams of the wax and adding 82 grams of previously heated petroleum naphtha with vigorous stirring. Stirring is then continued until precipitation starts. After the gel solidifies and is aged for 16 hours, the depth of penetration of a standard cone in 5 seconds, at 25° C., is measured in tenths of a millimeter. The apparatus used is described in American Society for Testing Materials: Designation D-217-48. It will be noted from the examples that the cone penetrometer readings indicate the gel strength of each of the vegetable waxes is substantially improved by our process. Whereas esparto and ouricuri were shown in the examples, the gel-forming properties of sugar cane, caranda and deresinated candelilla waxes are similarly improved.

The only operable materials to effect the wax modification are materials selected from the group consisting of maleic, succinic and glutaric anhydrides. These anhydrides react with the free hydroxyl groups of the waxes, forming half-esters and a free carboxyl group. It is essential that from 40 to 85% of these wax hydroxyls be esterified with the specific anhydride. Since only one of the two carboxyl groups available from the anhydride takes part in the reaction, this should be considered in the calculation of the amount of anhydride to be used in the esterification.

To obtain the desired esterification, I have found that an excess of the anhydride is required. This is essential because of the high sublimation rates of the anhydrides. Any excess that remains after the reaction can easily be removed by washing with a solvent in which the wax product is insoluble but the anhydride is soluble, the most obvious being water. Removal could also be accomplished by subliming out the excess by blowing an inert gas through the hot molten mixture.

If too little anhydride is used or if too much is lost through sublimation and insufficient esterification occurs, less than 40%, no noticeable improvement will be noted in the gel-forming properties of the wax product. An upper limit of 85% is set because, under the conditions of my process, even if a large excess of anhydride is used, I have found the waxes cannot be further esterified.

The preferred temperature range is 130–140° C., but may be varied from 120° C. to 150° C. Temperatures below 120° C. will slow the reaction to a negligible rate and those above 150° C. will cause degradation of the wax and an excessive loss of anhydride through sublimation.

It is preferred that agitation of the molten wax be conducted while the anhydride is being added and throughout the reaction.

Thus, through the practice of my prescribed process as stated in the claims hereafter following, a new and improved wax succinic, maleic or glutaric derivative material is produced which has substantially improved gel-forming properties.

Other modes of applying the invention may be employed instead of those explained, change being made as regards the process herein described and/or its new and improved wax product, provided the step or steps stated or the new and improved wax product described in any of the following claims or the equivalent of such stated step or steps or product be employed.

I claim:

1. A method of improving the gel strength of a wax of the group consisting of ouricuri, caranda, sugar cane, deresinated candelilla and esparto grass for use in polishes of the wax-solvent type, comprising esterifying from 40 to 85% of the free hydroxyl groups of said wax with an excess of a material selected from the group consisting of maleic, succinic and glutaric anhydrides at a temperature within the range of 120 to 150° C.

2. A method of improving the gel strength of a wax of the group consisting of ouricuri, caranda, sugar cane, deresinated candelilla and esparto grass for use in polishes of the wax-solvent type, comprising esterifying from 40 to 85% of the free hydroxyl groups of said wax with an excess of a maleic anhydride at a temperature within the range of 120 to 150° C.

3. A method of improving the gel strength of a wax of the group consisting of ouricuri, caranda, sugar cane, deresinated candelilla and esparto grass for use in polishes of the wax-solvent type, comprising esterifying from 40 to 85% of the free hydroxyl groups of said wax with an excess of a succinic anhydride at a temperature within the range of 120 to 150° C.

4. A method of improving the gel strength of a wax of the group consisting of ouricuri, caranda, sugar cane, deresinated candelilla and esparto grass for use in polishes of the wax-solvent type, comprising esterifying from 40 to 85% of the free hydroxyl groups of said wax with an excess of a glutaric anhydride at a temperature within the range of 120 to 150° C.

5. A method of improving the gel strength of deresinated candelilla wax for use in polishes of the wax-solvent type, comprising esterifying from 40 to 85% of the free hydroxyl groups of said wax with an excess of a material selected from the group consisting of maleic, succinic and glutaric anhydrides at a temperature within the range of 120 to 150° C.

References Cited in the file of this patent

UNITED STATES PATENTS

| | | |
|---|---|---|
| 2,521,553 | Treacy | Sept. 5, 1950 |
| 2,682,516 | Wilder et al. | June 29, 1954 |

OTHER REFERENCES

Balch: "Wax and fatty by products from sugarcane," Technological Report, Series No. 3, Sugar Research Foundation, Inc., New York (October 1947). (Copies in Div. 63 (p. 28).)

Warth: "The Chemistry and Technology of Waxes," copyright 1947, pp. 110–112. (Copy in Div. 63.)